Oct. 14, 1930.                A. L. SORESI                1,778,570
BRAKE
Filed July 3, 1926
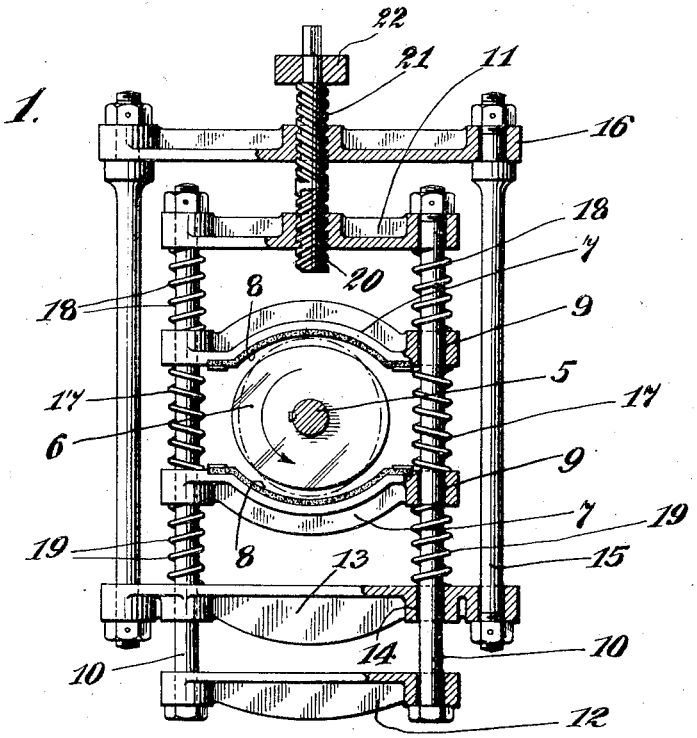
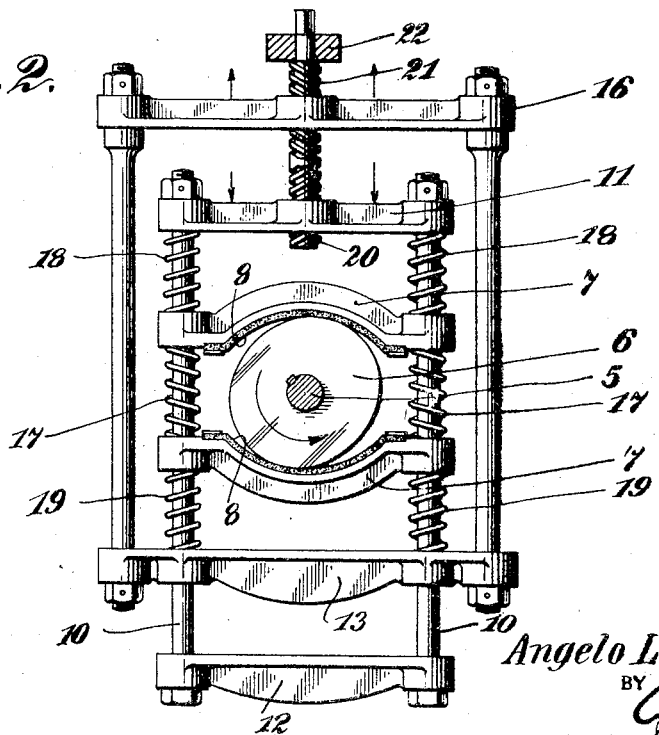
INVENTOR
Angelo L. Soresi
BY
his ATTORNEY Patented Oct. 14, 1930

1,778,570

UNITED STATES PATENT OFFICE

ANGELO L. SORESI, OF NEW YORK, N. Y.

BRAKE

Application filed July 3, 1926. Serial No. 120,257.

This invention relates to brakes, and has for its primary object to provide a novel form of brake which will be highly effective in its action, and is of more or less general application and can be advantageously used in connection with motor vehicles.

Heretofore, in brakes of this character, the rotary member to which the braking action is to be applied has been of circular form, all points of the periphery thereof being equally distanced from the center of rotation. The fundamental principle of my present invention involves the use of a rotary member of non-circular form, of general elliptical shape.
This member operates between opposed brake shoes yieldingly sustained in spaced relation to each other, and suitable means is provided for adjusting said brake shoes with respect to the rotary member so that said member in its rotation tends to gradually urge said brake shoes apart, resulting in a gradually increasing braking pressure upon the periphery of said member until it is finally brought to a stop.
It is a further general object of my invention to provide a brake as above characterized which is of relatively simple construction, may be easily operated and in which the application of the braking pressure will be practically automatic.

With the above and other objects in view, the invention consists in the improved brake, and in the form, construction and relative arrangement of its several parts as will be hereinafter more fully described, illustrated in the accompanying drawing, and subsequently incorporated in the subjoined claims.

In the drawing, wherein I have disclosed one simple and practical embodiment of the invention and in which similar reference characters designate corresponding parts throughout the several views,—

Figure 1 is an elevation partly in section showing one application of the principle involved in my present invention with the brake shoes disposed in released position, and Fig. 2 is a similar view showing the positions of the brake shoes after they have been adjusted for application of the braking pressure to the rotary member.

Referring in detail to the drawing, 5 designates the shaft upon which the rotary member 6 in the form of a drum or disc is secured. As shown, this member is of non-circular form, the major and minor axes thereof intersecting the axis of the shaft 5. In other words, this member is more or less elliptical in shape so that spaced points on the periphery thereof are located at different distances from the shaft center.

The brake shoes 7 are arranged at opposite sides of the member 6. The ends of these brake shoes have openings 9 therein through which rods 10 are loosely engaged. The upper and lower ends of these rods are connected by the heads 11 and 12 respectively.

Below the lower brake shoe 7 a bar 13 is arranged having openings 14 therein loosely receiving the rods 10. To the opposite ends of this bar the lower ends of the vertical rods 15 are connected while the upper ends of these rods are attached to the opposite ends of a bar 16.

Between the ends of the brake shoes 7 coiled springs 17 are arranged on the rods 10 and normally yieldingly hold the brake shoes in such spaced relation to each other as to permit of the free rotation of the member 6 without frictional engagement with the brake shoes. Coil springs 18 and 19 respectively, are also arranged between the ends of the brake shoes and the bars 11 and 13 so that they exert a counteracting pressure upon the ends of the brake shoes, tending to urge the same towards each other and compress the interposed springs 17.

Any suitable means may be provided for operating the two frames consisting respectively of the parts 11 and 12 and connecting rods 10 and the parts 13 and 16 and the connecting rods 15. For purposes of illustration, I have shown a worm screw having right and left hand threaded sections 20 and 21 respectively, engaged in threaded openings of the parts 11 and 16. This screw at its upper end is rotatably mounted or journalled in a relatively fixed part 22 and any suitable means may be provided for actuating said screw. Upon rotating said screw in one direction, it will be evident from a comparison of Figs. 1 and 2 of the drawing that the outer frame including bars 16 and 13 and rods 15 will be moved upwardly, while the inner frame consisting of bars 11 and 12 and rods 10 will be moved downwardly. Thus, the upper set of springs 18 will be compressed by bar 11 forcing the upper brake shoe downwardly and the lower springs 19 will be compressed by bar 13 and force the upper brake shoe upwardly. The springs 17 are thus compressed and the said shoes are brought into frictional contact upon the periphery of the rotating member 6. As this member rotates and the longer axis thereof approaches a position at right angles to the length of the brake shoes, the frictional braking pressure gradually increases, thus checking the speed of rotation of said member 6 and finally bringing said member and the shaft 5 on which it is secured to a stop. The quickness with which the member 6 and shaft 5 are brought to a complete stop is of course, determined by the resistance offered by springs 18 and 19 to the separating movement of the brake shoes and the extent to which the inner and outer frames are moved by the worm screw or other adjusting means which may be employed for this purpose. It will however, be observed that after such adjustment has been made, no further manual operation is required and the actual application of a braking pressure of gradually increasing effectiveness upon the rotating part is entirely automatic.

From the above description, it is believed that the several novel features of my new brake and the principle of its operation will be fully understood. I have found the same under actual tests to be highly effective. It will be apparent that the drawing accompanying this description is purely illustrative of the operating principle of the brake and that in the various practical applications thereof which are possible, other forms and arrangements of the several cooperating elements as well as the actuating means for positioning the brake shoes may be provided. Accordingly, it is to be understood that I do not desire to be limited to these detail features of the present disclosure, but reserve the right to exemplify the fundamental principle of my invention in various other alternative structural forms as may be fairly considered as within the spirit and scope of the invention as claimed.

I claim:

1. A brake including two cooperatively associated means, one of said means consisting of complementary parts movable relative to each other, and the other of said means consisting of an elliptically shaped part, said last-named means being mounted upon a power driven member to rotate therewith, and manually controlled means for positioning said first named parts relative to each other and with respect to said elliptical part to produce a direct co-action between said associated means and impress a braking force upon said power driven member.

2. In a brake, a non-circular rotary member, brake shoes normally out of frictional contact therewith, rods passing slidably through the ends of the brake shoes, springs encircling the rods between the brake shoes, a cross-bar uniting one of said rods, springs encircling said rods between one of said brake shoes and said bar, a cross-bar adjacent the other brake shoe slidably mounted on said rods, springs encircling said rods between the last-named cross-bar and the other brake shoe, and means for forcing said cross-bars toward each other to actuate the brake shoes into engagement with said member.

3. In a brake, a non-circular rotary member, brake shoes normally out of frictional contact therewith, rods passing slidably through the ends of the brake shoes, springs encircling the rods between the brake shoes, a cross-bar uniting the rods at one end, springs between said cross-bar and one of said brake shoes, a cross-bar uniting the other ends of the rods, a cross-bar slidably mounted on said rods between the last-named cross-bar and the other brake shoe, a cross-bar adjacent the first-named cross-bar, rods uniting the last-named cross-bar with the cross-bar between the second named cross-bar and the other brake shoe, and rotary means having reverse threads engaging the first and last named cross-bars to enable the brake shoes to be forced into position to be engaged by the rotary member.

4. In a brake, inner and outer rigid frames connected for endwise movement in a direction towards each other, the inner frame extending into and passing into the outer frame, a pair of brake shoe members slidable on the inner frame within the outer frame, arranged to be moved towards each other and adapted to exert braking action upon the opposite sides of an element interposed between them, and means arranged to be rendered effective consequent upon the movement of such rigid frames towards each other to force said brake shoe members towards each other and against the opposite sides of the element interposed between them.

5. In a brake, inner and outer rigid frames connected for endwise movement in directions towards and away from each other, the inner frame extending into and passing into the outer frame, a pair of brake shoe members slidable on the inner frame within the outer frame arranged for movement in directions towards and away from each other and adapted when moved towards each other to have braking action upon the opposite sides of an element interposed between them, means arranged to be rendered effective consequent upon the movement of said frames towards each other to force said brake shoe members towards each other and against the opposite sides of an element interposed between them, and means whereby automatically to move said brake shoe members away from each other as said frames are moved in a direction away from each other.

6. In combination, inner and outer frames connected for relative endwise movement and each consisting of rods and end members, a pair of brake shoe members movable on the rods of the inner frame, spring means on the rods of the inner frame imprisoned between one end member of the inner frame and one of said brake shoe members, spring means on the rods of the inner frame imprisoned between one end member of the outer frame and the other of the brake shoe members, and spring means on the rods of the inner frame imprisoned between the brake shoe members.

7. In combination, inner and outer frames connected for relative endwise movement and each consisting of rods and end members, a pair of brake shoe members movable on the rods of the inner frame, spring means on the rods of the inner frame imprisoned between one end member of the inner frame and one of said brake shoe members, spring means on the rods of the inner frame imprisoned between one end member of the other frame and the other of the brake shoe members, spring means on the rods of the inner frame imprisoned between the brake shoe members, and adjusting means connecting an end member of the inner frame with an end member of the outer frame.

In testimony that I claim the foregoing as my invention, I have signed my name hereto.

ANGELO L. SORESI.